Dec. 4, 1923.  
F. L. CANTRALL  
STEERING WHEEL  
Filed Feb. 8, 1919  
1,476,145
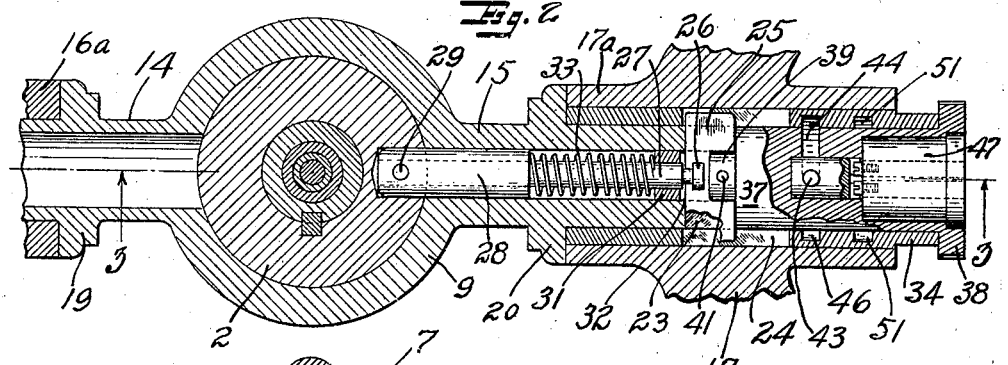
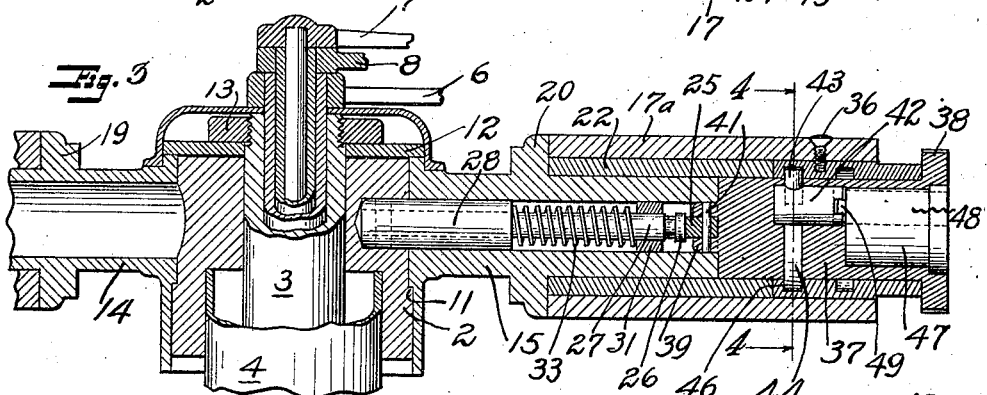
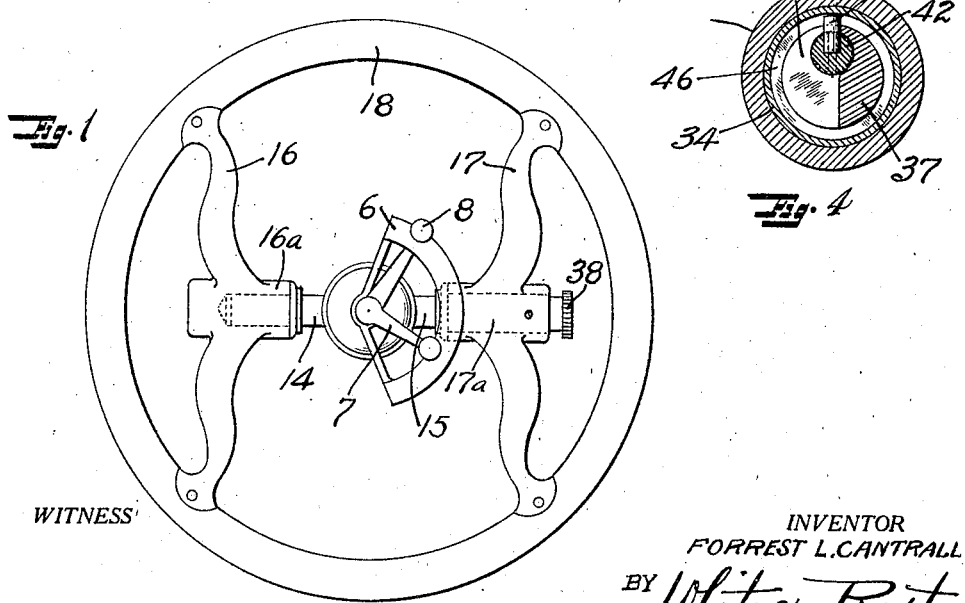
INVENTOR  
FORREST L. CANTRALL  
BY White & Frost  
HIS ATTORNEYS Patented Dec. 4, 1923.

1,476,145

UNITED STATES PATENT OFFICE.

FORREST L. CANTRALL, OF OAKLAND, CALIFORNIA, ASSIGNOR TO LIBERTY PATENTS SYNDICATE, A CORPORATION OF NEVADA.

STEERING WHEEL.

Application filed February 8, 1919. Serial No. 275,869.

*To all whom it may concern:*

Be it known that I, FORREST L. CANTRALL, a citizen of the United States, and a resident of Oakland, county of Alameda, and State of California, have invented a new and useful Steering Wheel, of which the following is a specification.

My invention relates to steering wheels for automobiles and an object of the invention is to provide a steering wheel which is movable to allow greater clearance about the wheel for the driver in entering or leaving his seat.

Another object of the invention is to provide a steering wheel which may be locked out of engagement with the steering post so that the automobile cannot be operated, the device thus constituting an effective means of preventing theft or unauthorized use of the car.

Another object of the invention is to provide a steering wheel which may be disconnected from the steering post so that it is rotatable relative thereto, and then locked in this position, and which may also be tipped about an axis lying in a plane transverse to the axis of the steering post, the combination of these two movements making it possible to position the wheel in a plane parallel to the edge of the driver's seat irrespective of the position of the front wheels of the car.

The invention possesses other features of advantage, some of which, with the foregoing, will be set forth in the following description of the preferred form of my invention which is illustrated in the drawings accompanying and forming a part of the specification. It is to be understood that I do not limit myself to the showing made by the said drawings and description, as I may adopt variations of the preferred form within the scope of my invention as set forth in the claims.

Referring to the drawings:

Figure 1 is a plan view of the steering wheel of my invention;

Figure 2 is a horizontal sectional view through a portion of the wheel structure;

Figure 3 is a vertical sectional view through a portion of the wheel structure;

Figure 4 is a vertical sectional view through a portion of the wheel structure, the plane of section being indicated by the line 4—4 of Figure 3.

In general terms my invention comprises a cylindrical head fixed upon the steering post of the automobile, a hub journaled upon the head, axially alined arms fixed on the hub perpendicular to the axis of its rotatable movement, spiders journaled upon the arms, and a rim fixed upon the spiders. Means are provided for locking the hub and the head together, to cause them to rotate as one, when the wheel is turned to steer the car, and simultaneously therewith, locking the spiders and the arms together to fix the plane of the wheel relative to the axis of the steering post. Means are also provided for locking the locking means either in the engaged or disengaged position.

A cylindrical head 2 is fixed upon the steering post 3 and journaled upon the upper end of the steering column 4. A quadrant 6 and control levers 7 and 8 are provided in accordance with common practice. Journaled or pivotally mounted upon the head 2 is a hub 9 which is positioned thereon by the shoulder 11 and the flange plate 12 secured against the head by the nut 13. A housing 14 encloses the flange plate and upper face of the head and hub.

Extending radially from the hub and perpendicular to the rotative axis thereof are alined arms 14 and 15 and journaled or pivotally mounted on there arms are spiders 16 and 17 respectively which carry the wheel rim 18. The arm 14 is hollow for lightness and strength and forms a plain bearing in the spider hub 16ª. The flange 19 formed on the arm 14 and bearing against the spider hub 16ª in conjunction with the flange 20 bearing against the spider hub 17ª and formed on the opposite arm 15, position the arms in the spider hubs and prevent axial movement therebetween.

The arm 15 is also journaled or pivotally arranged in the spider hub 17ª, but a bolt is disposed between the two and within the spider hub and the arm for locking together the hub 9 and the head 2, and the arm 15 and the spider hub 17ª, that is for simultaneously locking the arm to both the steering post and the rim. Means are also provided for locking the locking means or bolt in either the engaged or the disengaged position. In the engaged position, the plane of the wheel rim is fixed relative to the axis of rotation of the wheel and the hub 9 and the head 2 and steering post are operatively one structure so that rotation of the steering wheel effects the desired movement of the front wheels of the car. In the disengaged position, the steering wheel is operatively disconnected from the steering post and front wheels of the car, being freely rotatable upon the head, and is also capable of being tipped out of the plane perpendicular to its axis of rotation in which it normally lies, into a plane approaching parallelism with said axis. The practical effect of this freedom of movement is to permit the driver to tip the nearest edge of the steering wheel downwardly or upwardly, irrespective of the position of the front wheels of the car so that ample room is provided for entering or leaving his seat; and further, by locking the locking means or bolt, in the disengaged position, the car is rendered inoperative, and theft or unauthorized use effectively prevented.

Interposed between the spider hub 17a and the arm 15 is a sleeve or bushing 22 which is forced into the hub under pressure sufficient to fix it in permanent position in the hub, but which forms a turning fit with the arm journaled therein. The bushing 22 extends farther into the hub than the arm, and both the end of the arm and the contiguous walls of the bushing are provided with slots 23 and 24 respectively adapted to receive a bar bolt 25, which in one position, as shown in Fig. 2, engages both slots and prevents relative rotary motion between the arm and the spider hub, but which is slidable (to the right in Fig. 2) in the slot 24, until it leaves the slot 23 and disengages the end of the arm, thus leaving the arm and hub relatively rotatably movable. The bar bolt 25 is notched to engage the head 26 of a rod 27 extending through the hollow arm 15 and hub 9. The end of this rod is bushed with the bolt 28, which forms a sliding fit with the interior of the arm. The bolt is secured to the rod 27 by the pin 29 and is adapted to engage a recess formed in the head 2. When so engaged the hub 9 is operatively secured to the head 2, but on the retraction of the bar bolt 25, the bolt 28 with which it is operatively one, is withdrawn from the recess leaving the hub 9 free for rotational movement on the head. A bushing 31 is inserted in the end of the arm 15 and secured therein by upsetting the inner edges 32 at the bottom of the slots 23. This bushing surrounds the rod 27, preventing its disengagement from the bolt 25 and provides a fixed stop between which and the end of the bolt 28 a spring 33 is coiled about the rod 27. The function of the spring is to retain the bolt 25—28 in engaged position.

Means are provided for retracting the bolt 25—28 and for locking it in the retracted position. A bushing 34 of the same inside diameter as bushing 22 is inserted in the end of the hub 17 and held therein by the screw 36. A cylindrical plug 37 is slidably arranged within the bushing 34 and is provided with a knurled flange 38 on its outer end to provide a finger hold. The inner end of the plug is formed with a short extension 39 slotted to receive one side of the bar bolt 25 and secured thereto by a pin 41. Eccentrically mounted in the plug is a rotatable bolt 42 provided with an extension 43 lying in a transverse slot 44 formed in the plug and adapted in the position shown in Figures 3 and 4 to engage in an annular groove 46 formed in the bushing 34. A tumbler lock 47 of known design is mounted in the end of the plug 34 and the lock cylinder 48 operatively connected to the rotatable bolt by means of screws 49 or equivalent ridge engaging a slot formed in the end of the rotatable bolt. Because of its eccentric mounting, rotation of the rotatable bolt by the key of the lock 47, turns the bolt extension out of engagement with the groove 46 and into the deeper portion of the transverse slot 44, when the plug with its attached bolt 25—28 may be pulled outwardly by the knurled flange and against the resistance of the spring 33 until stopped by engagement of the bolt 25 with the end of the bushing 34, at which point the bolt extension 43 is in register with the annular groove 51 formed in the bushing 34, and may be engaged therein by turning the key back to first position, thus locking the bolt 25—28 in the disengaged position. The wheel may then be freely rotated on the steering post head and tipped into substantial parallelism with its axis of rotation, and the car is inoperable since it cannot be steered.

To again operatively connect the wheel for steering the car, the key is inserted in the lock and the rotatable bolt turned out of engagement with the groove 51 when the spring 33 will engage the bolt 25 with the arm 15 and the bolt 28 with the head 2 as soon as the wheel is tipped back and rotated to bring the parts successively into register. The rotatable bolt 42 is then turned to engage the groove 46, thus preventing any possible accidental disconnection, and the key removed. The proportion of the parts is such that the bar bolt 25 first engages in the end of the slot 23, thus temporarily fixing the plane of the wheel rim, and subsequently entirely seats in the slot when upon turning the wheel, the bolt 28 drops into its recess in the head 2.

I claim:

1. A steering wheel adapted to be secured to the steering post of an automobile, comprising a hub mounted for rotation on said steering post, a hollow arm extending from said hub, a spider pivotally mounted on said arm, a rim secured to said spider, a bar bolt slidably engaging the spider and engageable with said arm to lock the spider and arm together, a bolt connected to said bar bolt and slidably mounted in said arm and hub and engageable with said steering post to lock the hub to said steering post, and means slidably mounted in said spider for simultaneously operating said bolts.

2. A steering wheel adapted to be secured to the steering post of an automobile, comprising a hub mounted for rotation on said steering post, a hollow arm extending from said hub, a spider pivotally mounted on said arm, a rim secured to said spider, a bar bolt slidably engaging the spider and engageable with said arm to lock the spider and arm together, a bolt connected to said bar bolt and slidably mounted in said arm and hub and engageable with said steering post to lock the hub to said steering post, means slidably mounted in said spider for simultaneously operating said bolts, and means for locking said operating means in position.

3. A steering wheel adapted to be secured to the steering post of an automobile, comprising a hub mounted for rotation on said steering post, a hollow arm extending from said hub, a spider pivotally mounted on said arm, a rim secured to said spider, a bar bolt slidably engaging the spider and engageable with said arm to lock the spider and arm together, a bolt connected to said bar bolt and slidably mounted in said arm and hub and engageable with said steering post to lock the hub to said steering post, a spring for retaining said bolts in engaged position, a manually operated plug slidably arranged in said spider and connected to said bar bolt whereby said bolts may be retracted, and a key-controlled means in said plug for locking said bolts in position.

4. A steering wheel adapted to be secured to the steering post of an automobile, comprising a rim, a spider secured to the rim, an arm journaled in said spider and on said steering post, a bolt for locking the arm to the steering post and to the spider, a plug connected to said bolt and slidably mounted in said spider, and a bolt eccentrically mounted in said plug and rotatable into locked engagement with said spider when said first mentioned bolt is in operative and inoperative positions.

5. A steering wheel adapted to be secured to the steering post of an automobile, comprising a hub mounted for rotation on said stering post, a hollow arm extending from said hub, a spider pivotally mounted on said arm, a rim secured to said spider, a bar bolt slidably engaging the spider and engageable with said arm to lock the spider and arm together, a bolt connected to said bar bolt and slidably mounted in said arm and hub and engageable with said steering post to lock the hub to said steering post, a spring for retaining said bolts in engaged position, a manually operated plug slidably arranged in said spider and connected to said bar bolt whereby said bolts may be retracted, and a bolt eccentrically mounted in said plug and rotatable into locked engagement with said spider when said first mentioned bolts are in locking and in retracted positions.

6. In a steering wheel, a post having a pin slot, a cross head having a pin hole leading to said slot and terminating at its outer end in a lock chamber having transverse bolt slots in the wall thereof, a key pin inserted in said pin hole and entering said pin slot in the post and a lock mounted at the outer end of said pin and having a transverse locking bolt entering a bolt slot and holding said key pin to or from engagement.

In testimony whereof, I have hereunto set my hand at San Francisco, California, this 3d day of February, 1919.

FORREST L. CANTRALL.

In presence of—
C. S. EVANS.